United States Patent [19]
Blanding et al.

[11] Patent Number: 6,034,466
[45] Date of Patent: Mar. 7, 2000

[54] AMPLIFIER FOR AMPLIFICATION OF A MICROACTUATOR

[75] Inventors: David E. Blanding, Hawthorne; Jimmy L. Schmidt, Thousand Oaks, both of Calif.

[73] Assignee: Boeing North American, Inc., Seal Beach, Calif.

[21] Appl. No.: 08/996,377

[22] Filed: Dec. 22, 1997

[51] Int. Cl.[7] .................................................. H01L 41/08
[52] U.S. Cl. ............................................................ 310/328
[58] Field of Search ................................ 310/328, 323.01

[56] References Cited

U.S. PATENT DOCUMENTS

| | | | |
|---|---|---|---|
| 3,501,099 | 3/1970 | Benson | 310/328 |
| 3,766,415 | 10/1973 | Dame et al. | 310/8.3 |
| 3,946,551 | 3/1976 | Linebrink et al. | 60/39.2 R |
| 4,022,166 | 5/1977 | Bart | 123/32 JV |
| 4,140,936 | 2/1979 | Bullock | 310/328 |
| 4,272,200 | 6/1981 | Hehl | 310/328 X |
| 4,318,023 | 3/1982 | O'Neill et al. | 310/328 |
| 4,803,393 | 2/1989 | Takahashi | 310/328 |
| 4,928,030 | 5/1990 | Culp | 310/328 |
| 4,995,587 | 2/1991 | Alexius | 251/129 |
| 5,043,621 | 8/1991 | Culp | 310/316 |
| 5,055,733 | 10/1991 | Eylman | 310/328 |
| 5,115,880 | 5/1992 | Sallas et al. | 181/106 |
| 5,595,677 | 1/1997 | Neurgaonkar et al. | 252/62.9 |

FOREIGN PATENT DOCUMENTS

| | | | |
|---|---|---|---|
| 2087659 | 5/1982 | United Kingdom | 310/328 |

*Primary Examiner*—Mark O. Budd
*Attorney, Agent, or Firm*—Lawrence N. Ginsberg

[57] ABSTRACT

The amplifier assembly includes a driver bellows and an output bellows. The driver bellows includes a first end and a second end. The first end is positionable adjacent a microactuator. The output bellows includes a first end and a second end. The first end of the output bellows is securely attached to the second end of the driver bellows. The second end of the output bellows is positionable adjacent a device to be actuated. The output bellows has a smaller volume than the driver bellows. Each bellows is filled with a working fluid. When the driver bellows is compressed by the microactuator the fluid displacement of the driver bellows is translated to the output bellows causing a displacement in the output bellows equal to the fluid displaced in the driver bellows. Thus, an amplified output stroke is provided of the desired magnitude.

14 Claims, 2 Drawing Sheets

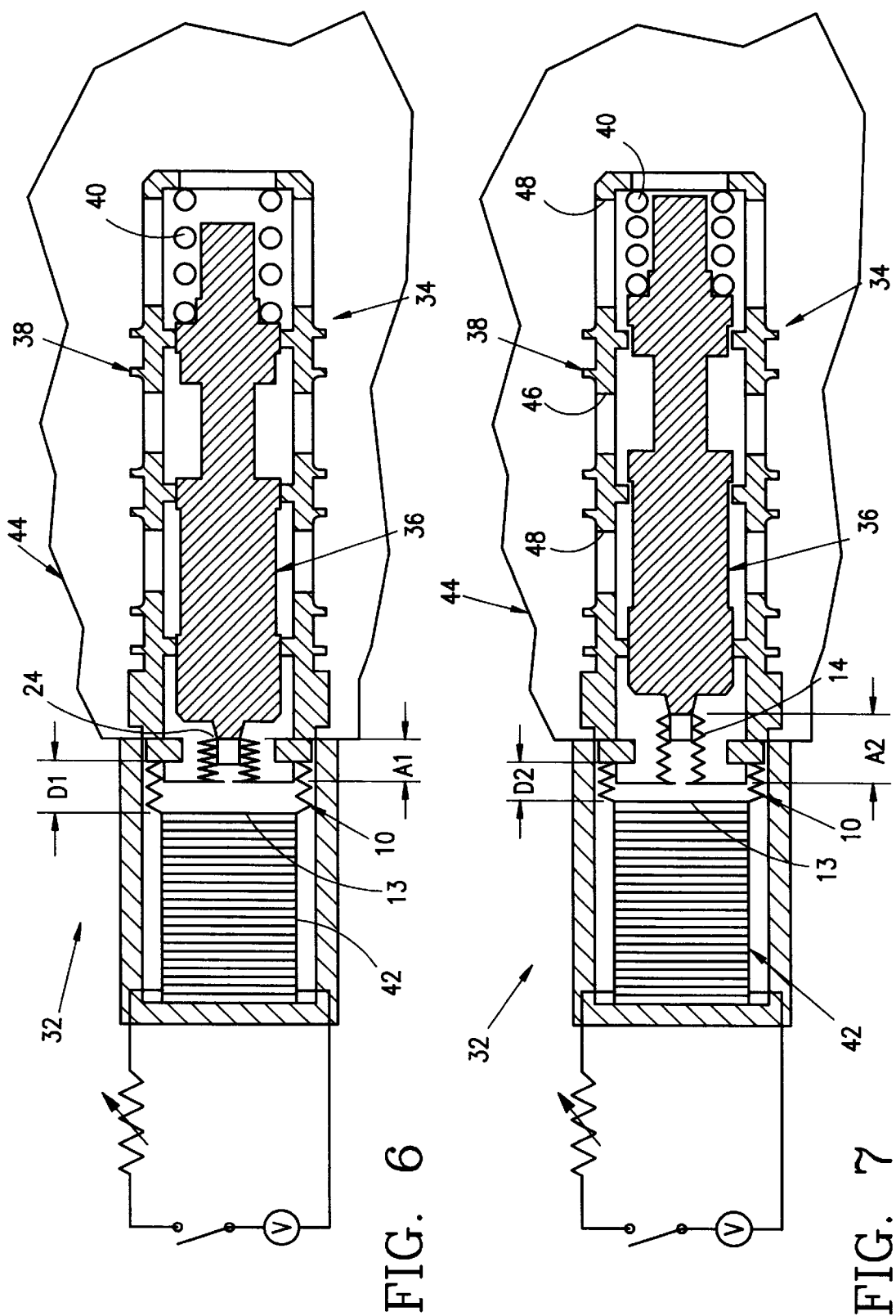

AMPLIFIER FOR AMPLIFICATION OF A MICROACTUATOR

BACKGROUND OF THE INVENTION

1. Field of the Invention

The present invention relates to mechanical amplifiers and more particularly to the use of bellows for amplifying a microactuator.

2. Description of the Related Art

The high force capability of electrically induced strain materials such as piezoelectric materials and terfenol-D materials offer high force output with small displacement. Piezoelectric materials are well known in the literature. For example, U.S. Pat. No. 5,595,677, issued to R. R. Neurgaonkar et al., discloses Nb-doped PLZT piezoelectric ceramics.

A relatively new type of electric actuation device, a piezoelectric actuator, has been developed that can potentially replace traditional actuation devices such as solenoid and/or servos. The piezoelectric actuator has several advantages over traditional actuation devices such as lower weight, smaller envelope, high reliability, higher output force, and more precise positioning. However, the piezoelectric actuator does not provide enough displacement to be practical for most applications. Examples of piezoelectric actuators have been disclosed and claimed in, for example, U.S. Pat. No. 5,043,621 and 4,928,030, both issued to G. W. Culp.

Prior attempts to solve the problem of deriving sufficient displacement have included using mechanical levers; belleville washers; metal, plastic or rubber diaphragms; and, hydraulic devices using various sizes of pistons with seals.

U.S. Pat. No. 4,803,393, issued to T. Takahashi, discloses the use of two bellows of different sizes separated by a metallic sleeve. The metallic sleeve includes a filling device for filling and venting and an O-ring for preventing fluid from leaking. The Takahashi device, by virtue of its somewhat complicated design and large number of parts, is not particularly compact. For many applications, such as aerospace applications requiring small, lightweight devices, it would be unworkable.

U.S. Pat. No. 5,055,733, issued to L. Aisleman, discloses a method for converting micromotions into macromotions utilizing telescoping hydraulic actuators of various diameters.

U.S. Pat. No. 4,995,587, issued to R. C. Alexias, discloses an electromechanical motion amplifier for controllably converting an input displacement into an amplified output displacement, using a dual piston arrangement.

U.S. Pat. No. 3,946,551, issued to K. L. Linebrink, et. al., discloses an electromechanical pumping and fuel metering means interfacing an electronic fuel control adapted for small engines.

U.S. Pat. No. 3,501,099, issued to G. M. Benson, discloses a chamber filled with low compressible fluid that is bounded by first and second plungers or diaphragms, the first plunger being operatively connected to the module. The area of the second plunger is established at a size smaller than the first plunger so as to provide for motion amplification of the relatively small mechanical displacement of an electro expansive module.

U.S. Pat. No. 3,766,415, issued to R. E. Dame, et. al, discloses an electro mechanical actuator acting on a large piston to force a small plunger to stroke a larger distance.

U.S. Pat. No. 4,022,166, issued to H. Bart, discloses the use of levers to amplify the stroke of a piezoelectric actuator.

U.S. Pat. No. 4,318,023, issued to C. G. O'Neill, et al., discloses an electro-expansive linear actuator which utilizes a sagittal tension member to amplify linear motion in which the electro expansive member is placed in compression between a fixed base support and a lever support member hingedly connected to the fixed base.

U.S. Pat. No. 5,515,880, issued to J. J. Salas, et. al, discloses a piezoelectric seismic vibrator with hydraulic amplifier in which a dry piston is provided having a cross sectional area which is smaller than the area of a power piston. The pressure within the fluid system acts to amplify the longitudinal displacement of the piezoelectric elements.

The aforementioned devices are generally complex, expensive, bulky and may not be particularly reliable because of their use of multiple parts.

OBJECTS AND SUMMARY OF THE INVENTION

It is therefore a principal object of the present invention to effectively utilize the high force output of the microactuator to drive a high stroke device.

It is another object to provide a high positional accuracy output stroke.

It is yet another object to provide a mechanical actuator of minimal size and weight.

It is still another object to provide a highly efficient mechanical actuator with minimum hysteresis, friction and inertia.

These and other objects are achieved by the present invention which is an amplifier assembly for amplification of a microactuator. The amplifier assembly includes a driver bellows and an output bellows. The driver bellows includes a first end and a second end. The first end is positionable adjacent a microactuator. The output bellows includes a first end and a second end. The first end of the output bellows is securely attached to the second end of the driver bellows. The second end of the output bellows is positionable adjacent a device to be actuated. The output bellows has a smaller volume than the driver bellows. Each bellows is filled with a working fluid. When the driver bellows is compressed by the microactuator the fluid displacement of the driver bellows is translated to the output bellows causing a displacement in the output bellows equal to the fluid displaced in the driver bellows. Thus, an amplified output stroke is provided of the desired magnitude.

The design is simple and inexpensive. The bellows are typically secured by simple weld joints. The amplifier assembly is a self contained, sealed unit which allows for easy replacement, easy installation, etc. The working fluid is preferably a gasless hardened hydraulic fluid of minimum volume which provides high positional accuracy.

Use of bellows, which are inherently relatively lightweight, provides low inertia. Bellows are frictionless devices and they obviate the need for additional sealing elements.

Other objects, advantages and novel features of the present invention will become apparent from the following detailed description of the invention when considered in conjunction with the accompanying drawings.

BRIEF DESCRIPTION OF THE DRAWINGS

FIG. 6 is a mechanical cross section/electrical schematic of the control valve assembly of the present invention, in an unactuated position.

FIG. 7 shows the control valve of FIG. 6 in an actuated position.

The same elements or parts throughout the figures are designated by the same reference characters.

DETAILED DESCRIPTION OF THE PREFERRED EMBODIMENT

Figure 1:
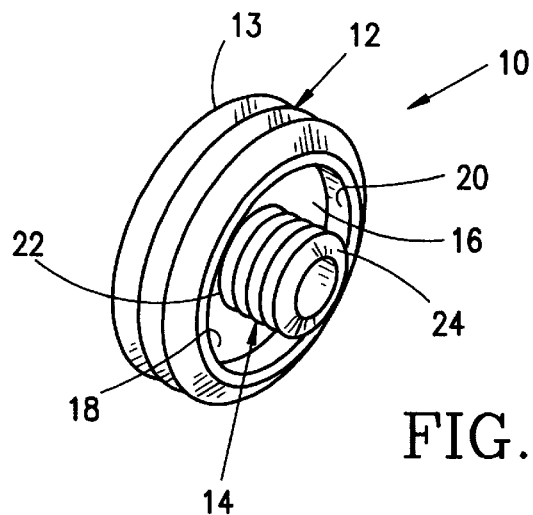
FIG. 1 is a perspective view of an amplifier assembly of the present invention.
Figure 3:
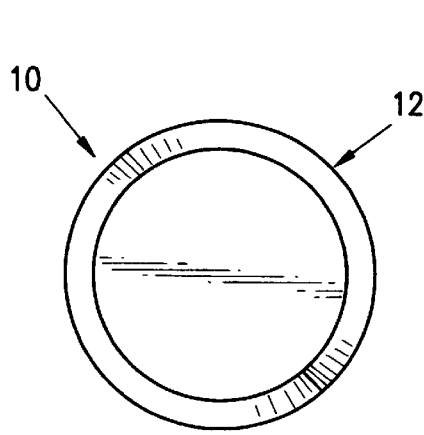
FIG. 3 is an end view of the amplifier assembly of FIG. 1.
Figure 2:
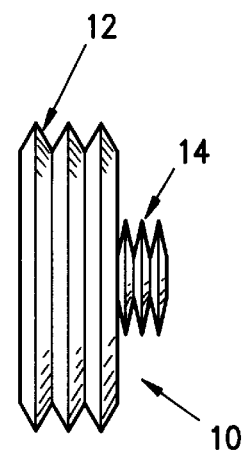
FIG. 2 is a side view of the amplifier assembly of FIG. 1.

Referring now to the drawings and to the characters of reference marked thereon, FIGS. 1–3 illustrate a preferred embodiment of the present invention, designated generally as 10. The amplifier assembly 10 includes a driver bellows, designated generally as 12, and an output bellows, designated generally as 14. The driver bellows 12 includes a first end 13 which is positionable adjacent to a microactuator (not shown). A second end 16 of the driver bellows 12 includes a base portion 18 and a side wall portion 20. Such a cup shape (i.e., having a base or recess 18) minimizes working fluid volume and package size and weight, as will be discussed in more detail below.

The output bellows 14 includes a first end 22 which is securely attached to the second end 16 of the driver bellows 12. The second end 24 of the output bellows 14 is positionable adjacent a device to be actuated (not shown in these figures).

The bellows 12, 14 are preferably formed of weldable, thin walled stainless steel. The wall thicknesses for typical aerospace applications might generally be on the order of about 0.002–0.010 inches. (This range is provided herein for the purpose of illustration and not limitation.) Stainless steel is preferably utilized because it is relatively inexpensive; however, it is clear that other suitable materials may be used depending on the desired application. For example, titanium alloys may be utilized where either a lighter weight and/or lower spring rate is desired. Metal bellows are manufactured by various companies including Senior Flexonics, Sharon, Mass.

Figure 4:
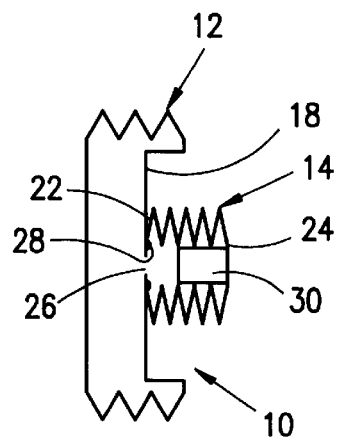
FIG. 4 is a cross sectional view of the amplifier assembly, in an unactuated position.

Referring now to FIG. 4, a cross sectional view of the amplifier assembly 10 is illustrated. As can be seen in this figure, the base portion 18 includes an orifice 26. Similarly, the same orifice 26 is in the first end 22 of the output bellows 14. Ends 18, 22 are bonded by a weld 28.

The second end 24 of the output bellows 14 has a recess 30 for reduced fluid volume and provides access to a fill tube (not shown) for filling the assembly 10 with working fluid.

The working fluid is preferably a gasless hardened hydraulic fluid. Such a hardened fluid has a high bulk modulus, such as, on the order of over 300,000 psi. The fluid is preferably introduced under vacuum conditions to remove all gases. This further enhances the hardness.

Figure 5:
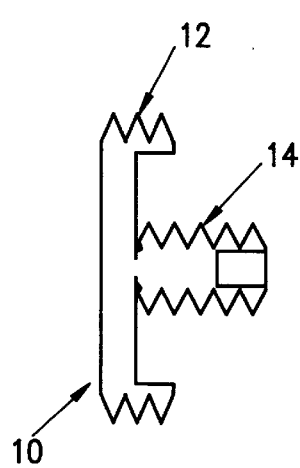
FIG. 5 is a cross sectional view of the actuator assembly in an actuated position.

Referring now to FIG. 5, when the driver bellows 12 is compressed by a microactuator (not shown) the fluid displacement of the driver bellows 12 is translated to the output bellows 14 causing a displacement in the output bellows 14 equal to the fluid displaced in the driver bellows 12. Thus an amplified output stroke of the output bellows 14 of the desired magnitude is provided. The desired magnitude may be, for example, on the order of 4 or 5, up to as much as 15 to 20 times the input displacement.

Referring now to FIG. 6, an example implementation of the amplifier assembly of the present invention is shown with application to a control valve assembly, designated generally as 32. The control valve assembly 32 includes an amplifier assembly 10 and a control valve, designated generally as 34. The control valve 34 includes an elongated control valve spool 36 positioned adjacent to, and in cooperative engagement with, the second end 24 of the output bellows 14. The spool 36 has varying cross sections along its length. The control valve includes a stationary sleeve 38 positioned about the spool 36. The stationary sleeve 38 has inner surfaces which cooperate with the varying cross sections of the spool 36, as will be discussed below.

The control valve 34 may include a spring 40 for enhancing spool return force or vibration damping. A microactuator 42 is positioned adjacent to the first end 14 of the driver bellows 12. The microactuator may comprise a piezoelectric actuator. As discussed above, in the Background section of this patent application, such piezoelectric actuators are well known and described in the literature. A housing 44 structurally supports the amplifier assembly 10, the control valve 34, and the microactuator 42.

Referring now to FIG. 7, the control valve assembly 32 is shown operated, with the valve turned on. The sleeve 38 has input flow channels 46 and output flow channels 48 formed therein. Inner surfaces of the sleeve cooperate with the varying cross sections of the spool 36 to provide the desired flow control as a spool 36 is positioned by the output bellows 14.

In a typical example, a driver bellows 12 may have a diameter of 0.791 inches and an output bellows 14 may have an outer diameter of 0.25 inches. In such a case, the difference between the end positions of the unactuated driver bellows and the actuated driver bellows (i.e., D1–D2) is 0.0032 inches. The output stroke of the driver bellows 14 (i.e., A2-A1) provides an output stroke of 0.032 inches. This example is based on a 1½ inch piezoelectric stack element.

Obviously, many modifications and variations of the present invention are possible in light of the above teachings. It is therefore to be understood that, within the scope of the appended claims, the invention may be practiced otherwise than as specifically described. What is claimed and desired to be secured by Letters Patent of the United States is:

1. An amplifier assembly for amplification of a microactuator, comprising:
   a) a driver bellows comprising a first end and a second end, said first end being positionable adjacent to a microactuator; and
   b) an output bellows comprising a first end and a second end, said first end being securely attached to said second end of said driver bellows, said second end of said output bellows positionable adjacent a device to be actuated, said output bellows having a smaller volume than said driver bellows, said driver bellows being in fluid communication with said output bellows, each bellows being filled with working fluid, wherein when the driver bellows is compressed by the microactuator the fluid displacement of the driver bellows is translated to the output bellows causing a displacement in the output bellows equal to the fluid displaced in the driver bellows, thus providing an amplified output stroke of the desired magnitude.

2. The amplifier assembly of claim 1 further comprising said microactuator, said microactuator comprising a piezoelectric actuator.

3. The amplifier assembly of claim 1, wherein said working fluid comprises an hydraulic fluid.

4. The amplifier assembly of claim 3, wherein said hydraulic fluid comprises gasless hardened hydraulic fluid.

5. The amplifier assembly of claim 1, wherein said driver bellows and output bellows are metal.

6. The amplifier assembly of claim 1, wherein said driver bellows and output bellows are securely attached by weld joints.

7. The amplifier assembly of claim 1, wherein said second end of said driver bellows is cup-shaped to provide a recess to minimize working fluid volume and package size and weight.

8. A control valve assembly, comprising:
   a) an amplifier assembly for amplification of a microactuator, comprising:
      i) a driver bellows comprising a first end and a second end, said first end being positionable adjacent to the microactuator; and
      ii) an output bellows comprising a first and a second end, said first end being securely attached to said second end of said driver bellows, said output bellows have a smaller volume than said driver bellows, said driver bellows being in fluid communication with said output bellows, each bellows being filled with working fluid, wherein
         when the driver bellows is compressed by the microactuator the fluid displacement of the driver bellows is translated to the output bellows causing a displacement in the output bellows equal to the fluid displaced in the driver bellows, thus providing an amplified output stroke of the desired magnitude; and
   b) a control valve, said control valve, comprising:
      i) an elongated control valve spool positioned adjacent to and in cooperative engagement with said second end of said output bellows, said spool having varying cross sections along its length; and
      ii) a stationary sleeve positioned about said spool having inner surfaces which cooperate with said varying cross sections of said spool to provide said desired flow control as said spool is positioned by said output bellows, said stationary sleeve having input and output flow channels formed therein.

9. The control valve assembly of claim 8, further comprising said microactuator, said microactuator comprising a piezoelectric actuator.

10. The control valve assembly of claim 8, wherein said working fluid comprises an hydraulic fluid.

11. The control valve assembly of claim 10, wherein said hydraulic fluid comprises gasless hardened hydraulic fluid.

12. The control valve assembly of claim 8, wherein said driver bellows and output bellows are metal.

13. The control valve assembly of claim 8, wherein said driver bellows and output bellows are securely attached by weld joints.

14. The control valve assembly of claim 8, wherein said second of said driver bellows is cup-shaped to provide a recess to minimize working fluid volume and package size and weight.

* * * * *